(12) United States Patent
Carolan et al.

(10) Patent No.: US 10,752,455 B2
(45) Date of Patent: Aug. 25, 2020

(54) BULK BAG SEALING SYSTEM

(71) Applicant: Schenck Process LLC, North Kansas City, MO (US)

(72) Inventors: Kent Carolan, Parkville, MO (US); Austin Petry, Goff, KS (US); Tim Strathman, Sabetha, KS (US)

(73) Assignee: Schenck Process LLC, Kansas City, MO (US)

( * ) Notice: Subject to any disclaimer, the term of this patent is extended or adjusted under 35 U.S.C. 154(b) by 272 days.

(21) Appl. No.: 15/659,348

(22) Filed: Jul. 25, 2017

(65) Prior Publication Data

US 2018/0022560 A1 Jan. 25, 2018

Related U.S. Application Data

(60) Provisional application No. 62/366,438, filed on Jul. 25, 2016.

(51) Int. Cl.
*B65G 69/18* (2006.01)
*B65B 69/00* (2006.01)

(52) U.S. Cl.
CPC ........ *B65G 69/183* (2013.01); *B65B 69/0075* (2013.01); *B65B 69/0083* (2013.01)

(58) Field of Classification Search
CPC .................................................. B65G 69/183
See application file for complete search history.

(56) References Cited

U.S. PATENT DOCUMENTS

| 5,947,333 A | 9/1999 | Hoffmann et al. |
| 6,138,443 A | 10/2000 | Taylor et al. |
| 7,223,058 B2 | 5/2007 | Nyhof |

FOREIGN PATENT DOCUMENTS

WO 2010/134102 11/2010

*Primary Examiner* — Saul Rodriguez
*Assistant Examiner* — Willie Berry, Jr.
(74) *Attorney, Agent, or Firm* — Hovey Williams LLP

(57) ABSTRACT

A sealing system for connecting a bulk bag to a material handling and processing system. The sealing system comprises a main housing and a discharge tube housed within the main housing. The discharge tube is configured to fluidly connect the bulk bag with the material handling and processing system. The sealing system additionally comprises a first seal configured to selectively seal the bulk bag with respect to the discharge tube, and a second seal configured to selectively seal an interior space of the main housing from the material handling and processing system.

17 Claims, 8 Drawing Sheets

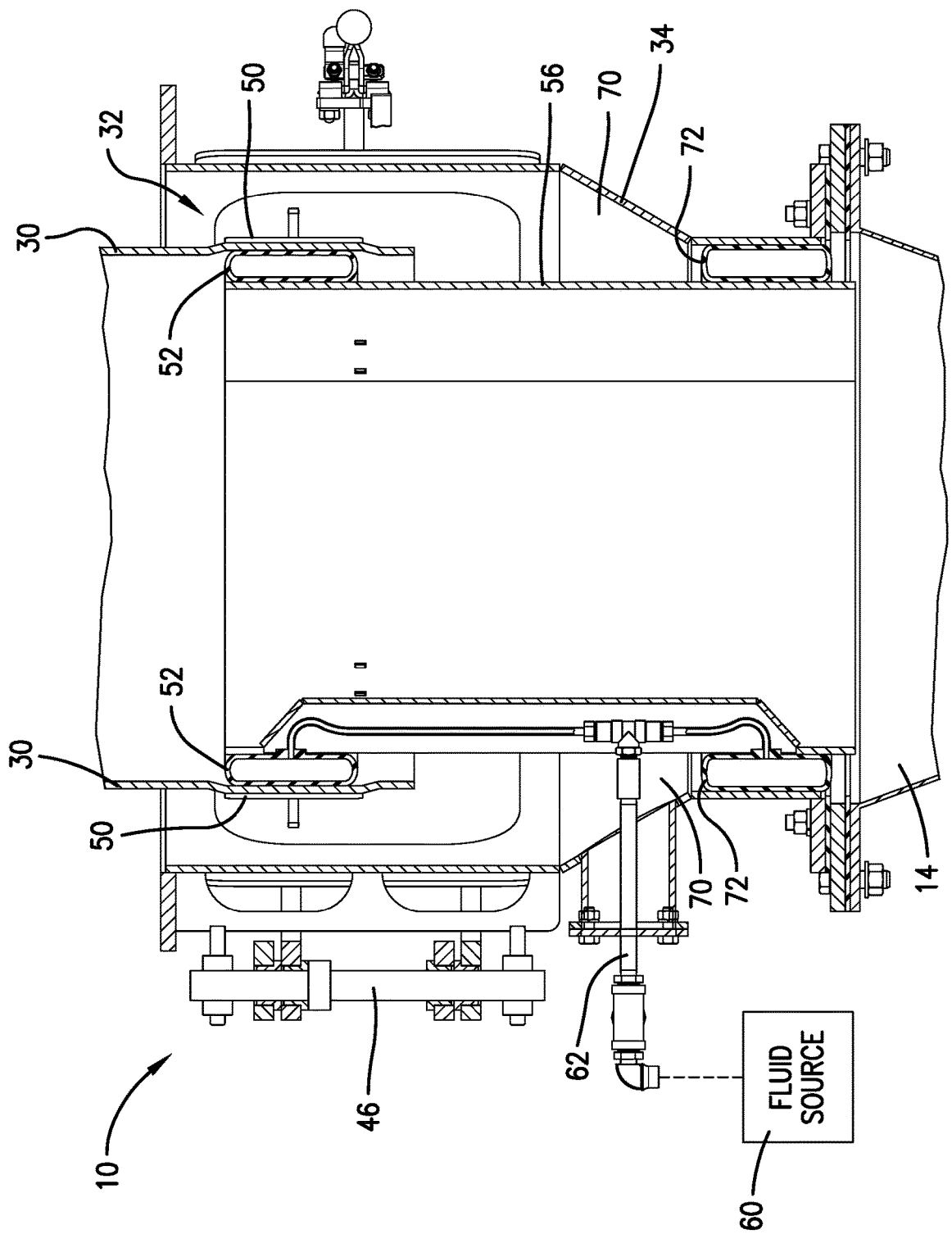

BULK BAG SEALING SYSTEM

CROSS-REFERENCE TO RELATED APPLICATION

The present non-provisional patent application claims priority with respect to all common subject matter of previously-filed U.S. Provisional Patent Application Ser. No. 62/366,438, entitled "BULK BAG SPILL PREVENTION SYSTEM," filed on Jul. 25, 2016. The entirety of the above-identified provisional patent application is hereby incorporated by reference into the present non-provisional patent application.

BACKGROUND OF THE INVENTION

1. Field of the Invention

Embodiments of the present invention relate generally to a bulk bag sealing system. In more detail, embodiments of the present invention are directed to a bulk bag sealing system for preventing spillage and airborne particulates as material is transferred from a bulk bag to a material handling and processing system.

2. Description of the Related Art

Certain material handling and processing systems receive materials via bulk bags. These bulk bags are generally configured as large, flexible containers, which may be formed from fabric, such as thick woven polyethylene or polypropylene. Bulk bags can be used to carry various types of dry, flowable material, such as powders, granules, pellets, or the like. In some cases, the bulk bags may be sized to carry as much as one ton or more of material.

To receive the material from the bulk bags, material handling and processing systems generally include material discharge devices to which the bulk bags are attached. Once a bulk bag is secured to such a material discharge device, the material within the bulk bag can be removed from the bulk bags and can flow into the material handling and processing system. In the past, material discharge devices have included various types of sealing mechanisms that function to seal the bulk bags to the material discharge devices, so as to prevent spillage of material as the material is transferred from the bulk bags to the material handling and processing systems. However, such previously-used sealing systems are inefficient at preventing spillage before, during, and after the bulk bags are attached to the material discharge devices. In addition, such previously-used sealing systems do not inhibit the generation of airborne particulates as material is transferred from the bulk bags to the material handling and processing systems.

As such, there is a need for an improved bulk bag sealing system that provides sealing of the bulk back when material is being discharged, that prevents spillage before and after the material has been transferred from the bulk bag into the material handling and processing system, and that inhibits the generation of airborne particulates during discharge of material from the bulk bag.

SUMMARY OF THE INVENTION

Some embodiments of the present invention include a sealing system for connecting a bulk bag to a material handling and processing system. The sealing system comprises a main housing and a discharge tube housed within the main housing. The discharge tube is configured to fluidly connect the bulk bag with the material handling and processing system. The sealing system additionally comprises a first seal configured to selectively seal the bulk bag with respect to the discharge tube, and a second seal configured to selectively seal an interior space of the main housing from the material handling and processing system.

Other embodiments of the present invention include a sealing system for connecting a bulk bag to a material handling and processing system. The sealing system comprises a discharge tube configured to fluidly connect the bulk bag with the material handling and processing system, a first pneumatic seal configured to selectively seal the bulk bag to the discharge tube, and a second pneumatic seal positioned below the first pneumatic seal between the first pneumatic seal and the material handling and processing system.

Some additional embodiments of the present invention include a method of connecting a bulk bag to a material handling and processing system. The method comprising the initial step of sealing, via a first seal, a bulk bag to a sealing system associated with the material handling and processing system. An additional step includes sealing, via a second seal, an interior space of the sealing system from the material handling and processing system. The initial sealing is performed simultaneously with the second sealing. The method further includes the step of causing material within the bulk bag to be emptied into the material handling and processing system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described in detail below with reference to the attached drawing figures, wherein:

FIG. 8 is another cross-section view of the bag sealing system as shown in FIG. 7, particularly illustrating the first seal and the second seal of the bag sealing system being energized.

Figure 1:
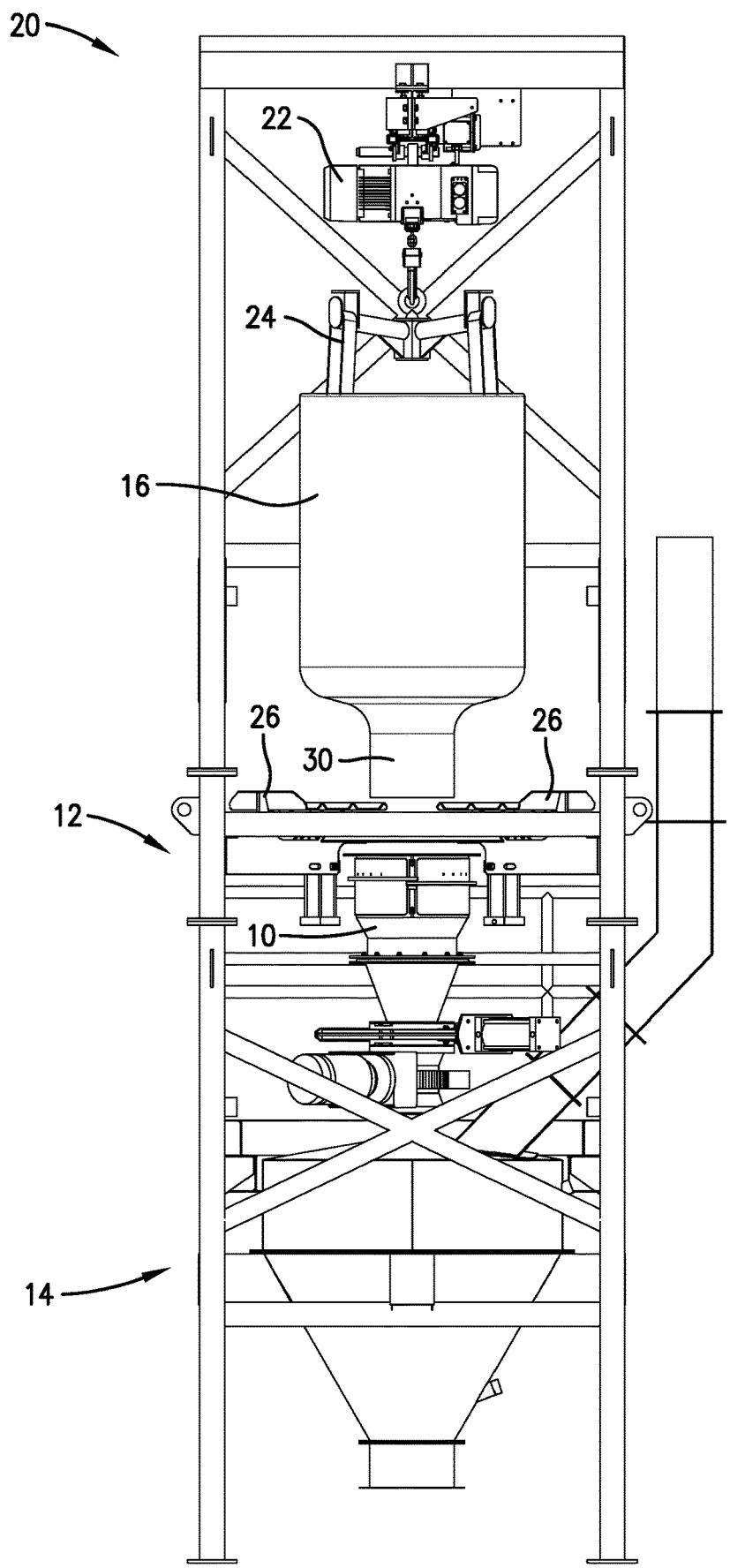
FIG. 1 is a front elevational view of a lifting assembly positioning a bulk bag into connection with a bulk bag sealing system associated with a material handling and processing system.
Figure 2:
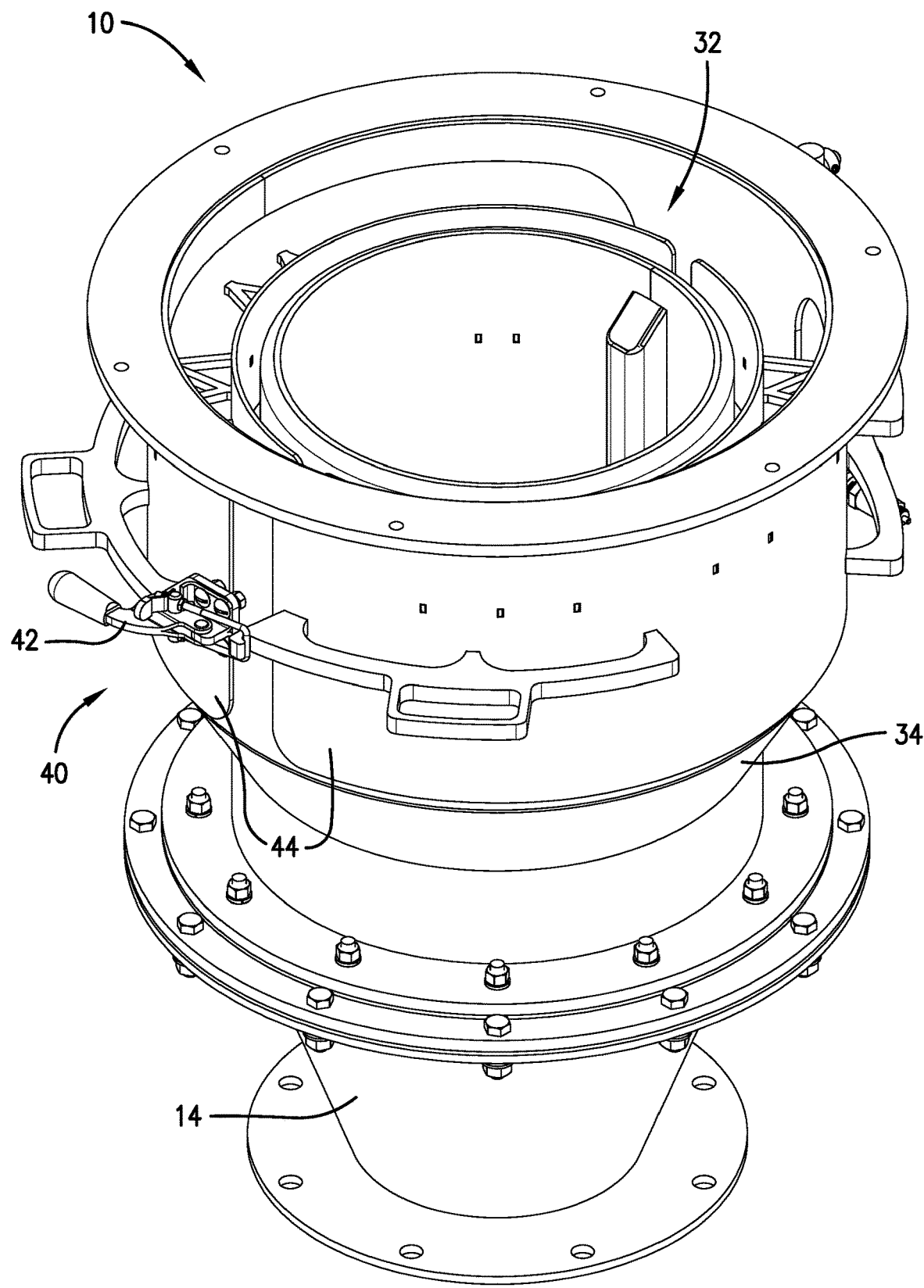
FIG. 2 is a front perspective view of the bag sealing system from FIG. 1, with a bottom of the bag sealing system being secured to a portion of the material handling and processing system.
Figure 3:
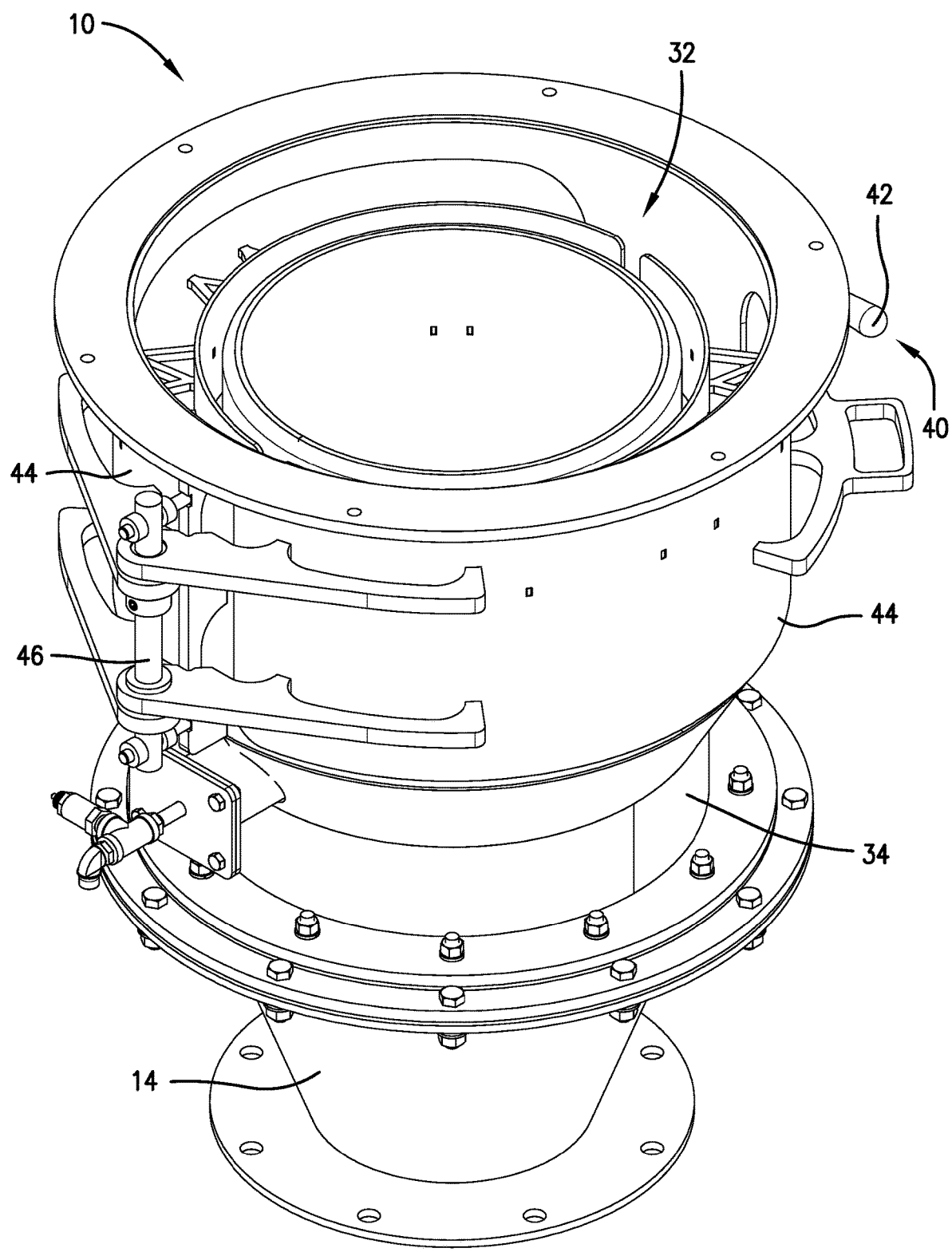
FIG. 3 is a rear perspective view of the bag sealing system from FIG. 2.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

With reference to FIG. 1, embodiments of the present invention are directed to a bulk bag sealing system 10 for a material discharge assembly 12 operably associated with a material handling and processing system 14. The bulk bag sealing system 10 may be connected with an upper portion of the material handling a processing system 14, such that when a bulk bag 16 is connected to the bulk bag sealing system 10, material from within the bulk bag can flow through the bulk bag sealing system 10 and down into the material handling a processing system 14. Beneficially, the bulk bag sealing system 10 of embodiments of the present invention is configured to prevent spillage from a bulk bag 16 as the bulk bag 16 is (1) being connected and disconnected to/from the bulk bag sealing system 10, and (2) connected to the bulk bag sealing system while material is transferred from the bulk bag 16 to the material handling a processing system 14. As such, the bulk bag sealing system 10 of the present invention is operable to prevent spillage of material from within the bulk bag 16 and also to prevent particulates associated with the material within the bulk bag 16 from escaping into the external environment to create airborne pollutants (e.g., dust).

Remaining with FIG. 1, a bulk bag unloader frame 20 may include a bag lifting assembly, which includes a lifting hoist 22 and a bag attachment hanger 24. The bag lifting assembly is configured to lift and maneuver the bulk bag 16 into position with respect to the material discharge assembly 12. The material discharge assembly 12 may include the bulk bag sealing system 10 and one or more bag massaging paddles 26 configured to massage the bulk bag 16 once connected to the material discharge assembly 12, so as to facilitate removal of the material from within the bulk bag 16. The bulk bag 16 may include a bag spout 30, which is configured to be attached to bulk bag sealing system 10 of the material discharge assembly 12. As such, the bulk bag sealing system 10 is configured to receive the material from the bulk bag 16, via the bag spout 30, so as to facilitate the transfer of the received material to the downstream components of the material handling and processing system 14.

As shown in FIGS. 2-8, the bulk bag sealing system 10 may include a spout seal assembly 32, which may be housed within a main housing 34 of the bulk bag sealing system 10. When the bulk bag 16 is lowered by the lifting hoist 22 until the bag spout 30 is adjacent to the bulk bag sealing system 10 (See, e.g., FIGS. 4-6), the spout seal assembly 32 can be used to sealingly secure the bulk bag 16 to the bulk bag sealing system 10 by sealing the bag spout 30 between components of the spout seal assembly 32.

In more detail, for a user to access the spout seal assembly 32, the bulk bag sealing system 10 may, as best shown in FIGS. 2-5, include an access assembly 40 comprising a clamping mechanism 42 configured to secure one or more cover panels 44 closed against the bulk bag sealing system 10. In some embodiments, the cover panels 44 may be hingedly secured to the bulk bag sealing system 10 via a common hinge assembly 46, as perhaps best shown in FIG. 3, such that the cover panels 44 can rotate away from the bulk bag sealing system 10 to an open position and the spout assembly 32 can be accessed. Specifically, with the cover panels 44 in the closed position (See FIGS. 2-3 and 6), the clamping mechanism 42 may be unlatched, such that the cover panels 44 can be rotated away from the bulk bag sealing system 10 to an open position (See FIGS. 4-5).

Figure 4:
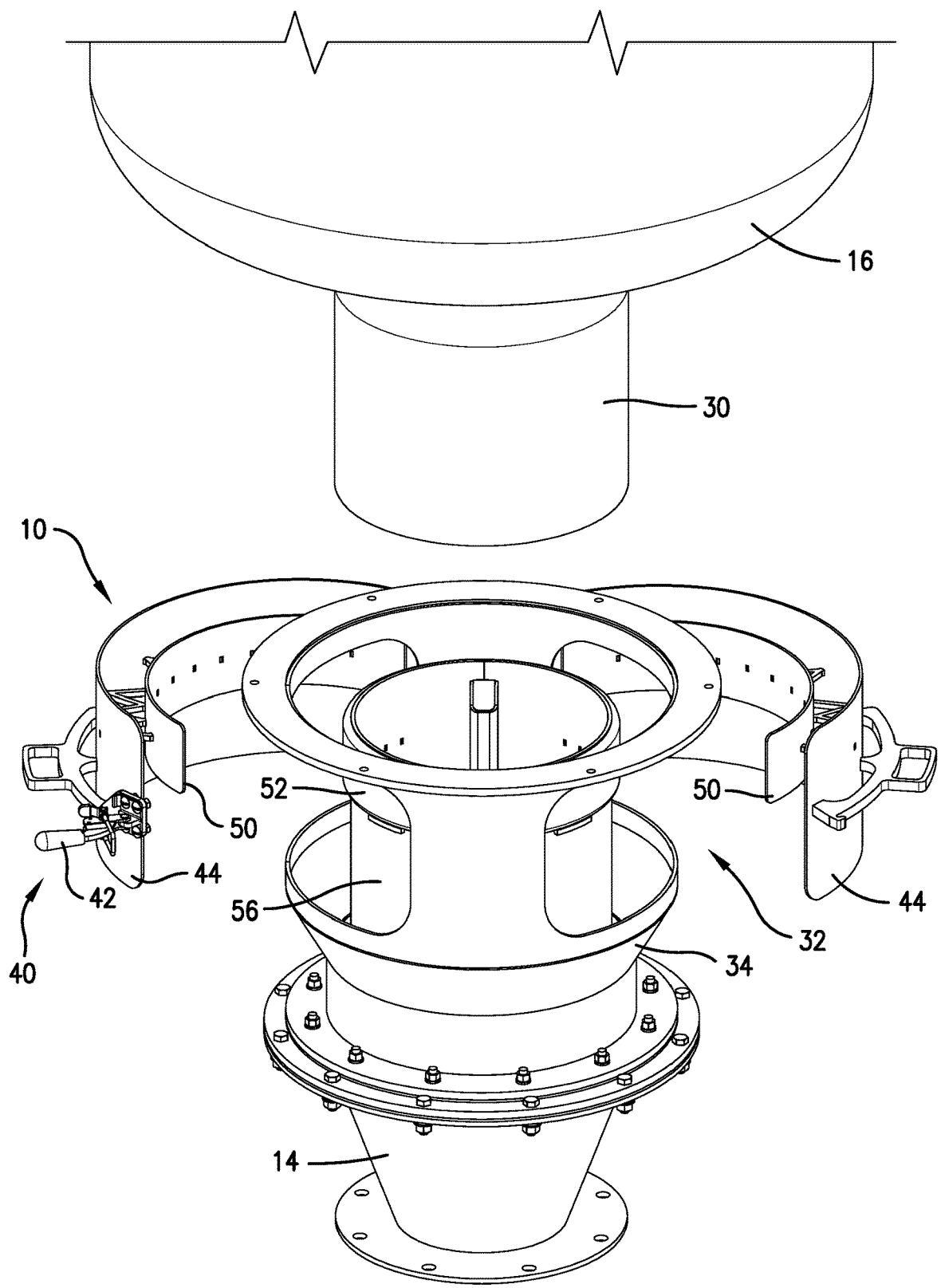
FIG. 4 is a front perspective view of the bag sealing system from FIGS. 2-3, with cover panels of the bag sealing system being opened and a bulk bag positioned above the bag sealing system.
Figure 5:
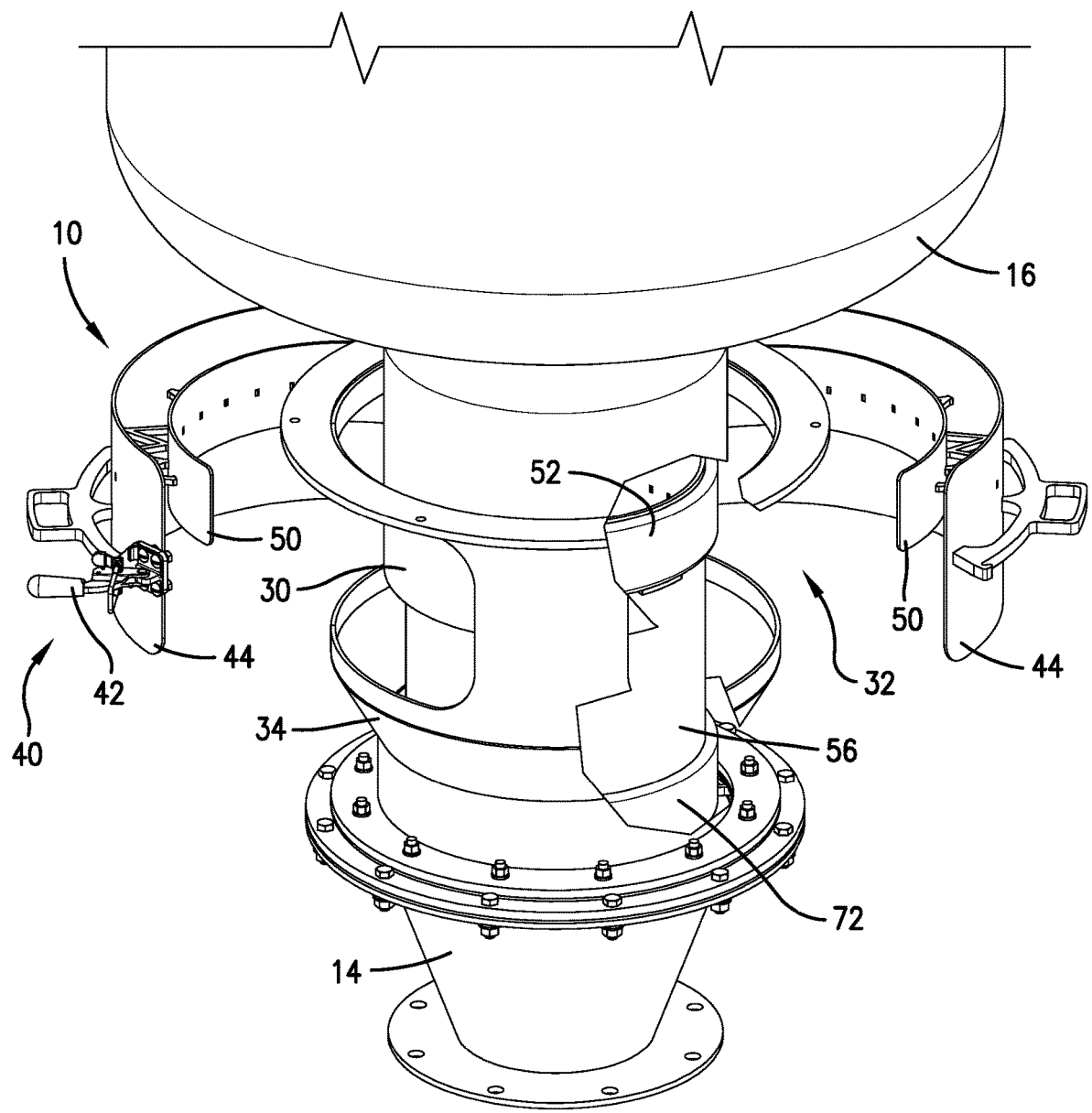
FIG. 5 is a front perspective view of the bag sealing system from FIGS. 2-4, with the bulk bag being lowered into engagement with the bag sealing system, and with a portion of the bag sealing system and the bulk bag being broken away to illustrate a first pneumatic seal and a second pneumatic seal of the bag sealing system.
Figure 6:
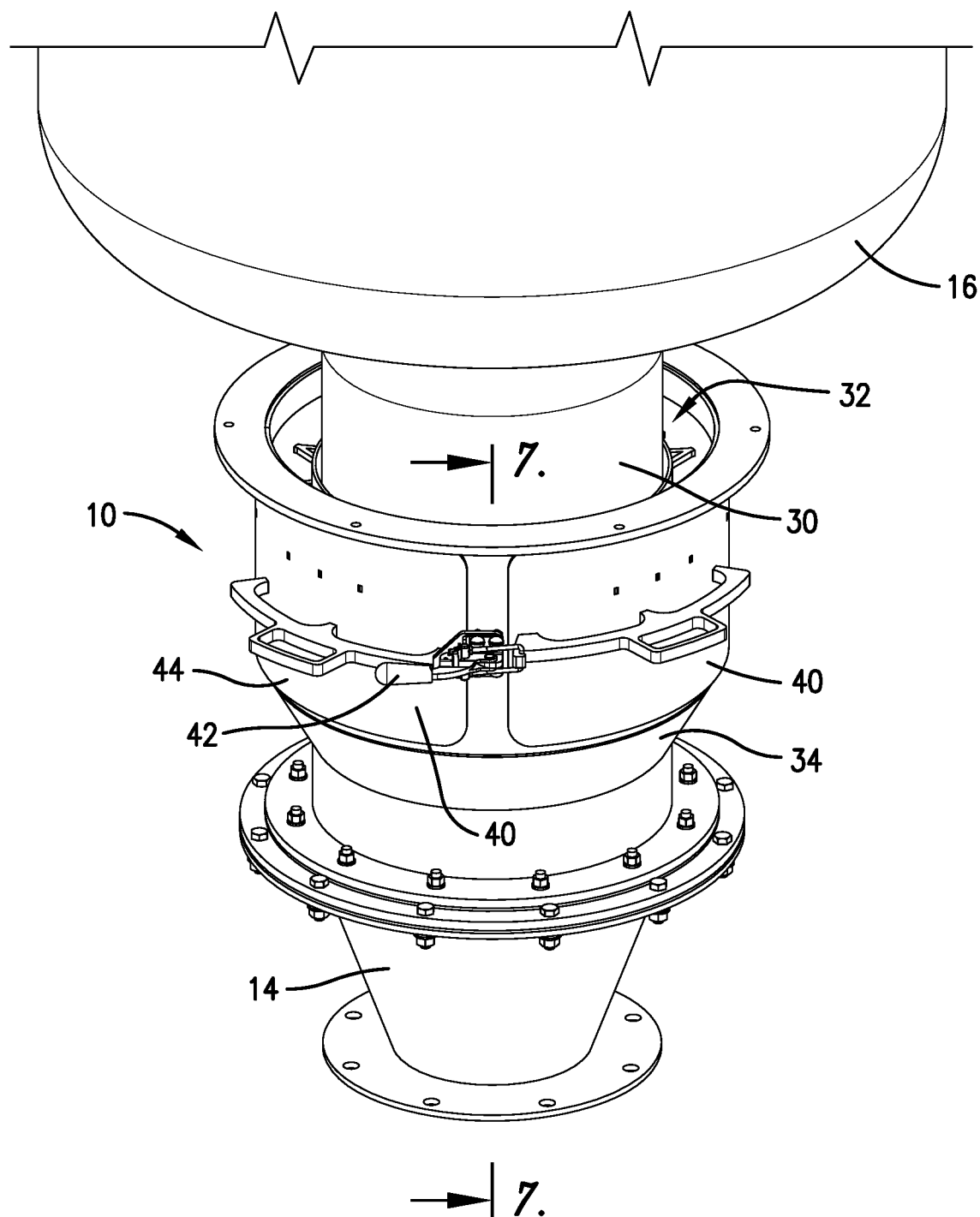
FIG. 6 is a front perspective view of the bag sealing system from FIGS. 2-5, with the bulk bag lowered into engagement with the bag sealing system, and the cover panels being closed.

With the cover panels 44 rotated away in the open position, as shown in FIGS. 4-5, the spout seal assembly 32 can be accessed so as to secure the bulk bag 16 to the bulk bag sealing system 10. In particular, as perhaps best illustrated in FIGS. 4-5 and 7, the bag spout 30 can be guided between a spout sealing plate 50 and an inflatable bag spout seal 52 until the bag spout 30 clears the bottom of the spout sealing plate 50. The spout sealing plate 50 may be configured as a flat, cylindrical section of material (e.g., steel) that surrounds the bag spout seal 52 and provides a sealing surface for the bag spout seal 52 to engage with. In some embodiments, such as shown in the drawings, the spout sealing plate 50 may comprise two arcuate elements, with each element being connected to an interior of the cover panels 44. As such, when the cover panels 44 are opened, the elements of the spout sealing plate 50 are likewise rotated away from the bulk bag sealing system 10 such that the bag spout 30 can be properly positioned between the spout sealing plate 50 and the bag spout seal 52. When the cover panels 44 are closed, the elements of the spout sealing plate 50 are rotated towards the bag spout seal 52 of the bulk bag sealing system 10 and completely (or nearly completely) encircle the bag spout seal 52.

The bag spout seal 52 may be a pneumatic seal or hydraulic seal, comprising an annular ring of elastic or semi-elastic material that can retain fluid as fluid is added to it. As such, the bag spout seal 52 is configured to expand (i.e., become energized) when filled with fluid and can contract (i.e., become de-energized) as fluid is extracted from the bag spout seal 52. As perhaps best shown in FIGS.

4-5 and 7, the bag spout seal 52 may be positioned approximate an upper portion of the bulk bag sealing system 10. Specifically, the bag spout seal 52 may be secured around an exterior surface of an upper end of a material discharge tube 56, with such discharge tube 56 housed within the main housing 34 and configured to act as a conduit through which material will pass when exiting from the bulk bag 16. As shown in the figures, the discharge tube 56 may be generally cylindrically-shaped so as to include an upper end and a lower end and may extends through the main housing 34 along a significant portion of a length of the bulk bag sealing system 10. As perhaps best shown in FIG. 7, the bottom end of the discharge tube 56 may be fluidly connected with the material handling and processing system 14, such that material deposited in an upper end of the discharge tube 56 can flow down into the material handling and processing system 14

Figure 7:
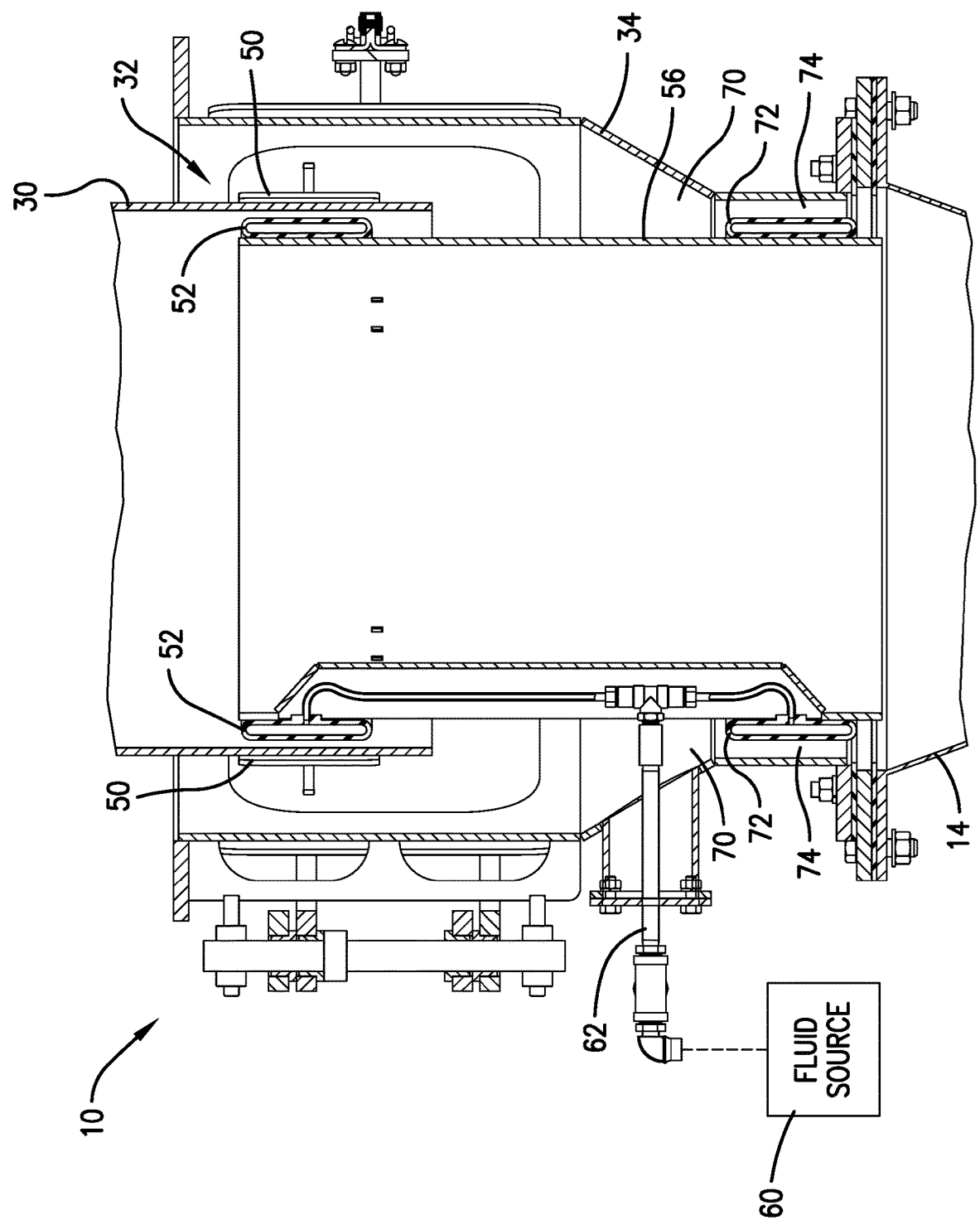
FIG. 7 is a cross-section view of the bag sealing system taken along line 7-7 from FIG. 6, particularly illustrating the first seal and the second seal of the bag sealing system being de-energized.

With continued reference to FIG. 7, once the bag spout 30 is positioned in place between the spout sealing plate 50 and the bag spout seal 52 of the spout seal assembly 32, a fluid source 60 can be pressurized to provide pressurized fluid, such as air, to the bag spout seal 52. The fluid source 60 may be a pneumatic pump, such as an air pump, configured to generate and provide pressurized air to the bag spout seal 52. In some embodiments, the fluid source 60 may be associated with a conduit 62 for fluidly connecting the fluid source 60 to the bag spout seal 52. The conduit 62 may include one or more valves, gaskets, or other pneumatic components necessary to direct fluid from the fluid source 60 to the bag spout seal 52. Upon providing fluid to the bag spout seal 52, the bag spout seal 52 will expand (i.e., energize) as it inflates. The bag spout seal 52 will expand, as shown in FIG. 8, against the spout sealing plate 50 so as to compress the bag spout 30 between the bag spout seal 52 and the spout sealing plate 50 so as to seal the bulk bag 16 to the spout seal assembly 32 of the bulk bag sealing system 10.

Embodiments of the present invention provide for the fluid source 60 to be controlled by one or more electro, mechanical, and/or pneumatic control components, such as buttons, levers, switches, dials, or the like. As such, a user can actuate the control components so as to activate the fluid source 60 and to, thus, inflate the bag spout seal 52 so as to seal the bag spout 30 of the bulk bag 16 to the bulk bag sealing system 10. With the bag spout seal 52 inflated so as to seal the bag spout 30 to the bulk bag sealing system 10, the bulk bag sealing system 10 is then able to receive material stored inside the bulk bag 16 and to transfer the material to the connected material handling and processing system 14 via the discharge tube 56. Beneficially, the bag spout seal 52 functions to prevent spillage and dust from escaping into the surrounding atmosphere during such transfer. Once the bulk bag 16 is emptied, the bag spout seal 52 can be de-pressurized, such that the bag spout 30 can be released from the spout seal assembly 32 and and removed from the bulk bag sealing system 10. Specifically, the control components can exhaust the fluid held within the bag spout seal 52, e.g., via the conduit 62, such that the bag spout 30 can be released from the spout seal assembly 32, as is illustrated in FIG. 7, and the bulk bag 16 can be removed from the bulk bag sealing system 10.

In some instances, however, when the bag spout seal 52 is de-energized and the bulk bag 16 unsealed from the bulk bag sealing system 10, residual material (or associated dust and particulates from the material) can fall down from the bulk bag spout 30 into an interior space 70 (See FIG. 7) of the bulk bag sealing system 10. In particular, such interior space 70 may be presented between the main housing 34 of the bulk bag sealing system 10 and the discharge tube 56. Without a means of escape, residual material may fill up the entire interior space 70. Such built up residual material may spill out from the bulk bag sealing system 10 when the cover panels 44 are opened. In addition to spillage, the residual material within the interior space 70 may cause airborne particulates to enter the external environment (i.e., external to the bulk bag sealing system 10 and/or the material handling and processing system 14).

To help alleviate issues with residual material spilling into and out of the bulk bag sealing system 10, embodiments of the present invention may include an additional sealing mechanism (in addition to the bag spout seal 52), which is configured to provide selective sealing between the main housing 34 and the discharge tube 56 of the bulk bag sealing system 10. As shown in FIG. 7, embodiments of the present invention may additionally include an interior space seal 72 positioned within the interior space 70 of the bulk bag sealing system 10, below the bag spout seal 52. In more detail, the interior space seal 72 may be secured around an exterior surface of the material discharge tube 56 adjacent to a lower end of the material discharge tube 56, such that the interior space seal 72 is positioned between the main housing 34 and the discharge tube 56. As with the bag spout seal 52, the interior space seal 72 may be a pneumatic seal or a hydraulic seal comprising an annular ring of elastic or semi-elastic material that can retain fluid as fluid is added to it. As such, the interior space seal 72 is configured to expand (i.e., energize) when filled with the fluid and contract (i.e., de-energize) as fluid is extracted from the interior space seal 72.

In some embodiments, the interior space seal 72 may be provided with fluid from the same fluid source 60 that is used provide fluid to the bag spout seal 52. As such, the conduit 62 may include a T-connector that allows the conduit 62 to branch off in two directions. One direction of the conduit 62 may connect with the bag spout seal 52 and the other direction of the conduit 62 may connect with the interior space seal 72. As such, fluid may be directed from the fluid source 60 to each of the bag spout seal 52 and the interior space seal 72, as is shown in FIGS. 7 and 8. In some embodiments, the control components of the bulk bag sealing system 10 may energize and de-energize the interior space seal 72 at the same time as the bag spout seal 52 is energized and de-energized. As will be described in more detail below, in such a configuration, the interior space seal 72 functions to prevent residual material from spilling from the bulk bag sealing system 10 and to prevent particulates and other dust from polluting the external environment.

As can be seen in FIGS. 7 and 8, the bulk bag sealing system 10 is secured to an upper end of the material handling and processing system 14. For instance, a bottom end of the bulk bag sealing system 10 may include a flange that can be secured to a corresponding flange on the upper end of the material handling and processing system 14. As such, a bulk bag 16 can be connected to the bulk bag sealing system 10 (i.e., by sealing the bag spout 30 via the spout seal assembly 32) and material can be emptied from the bulk bag 16 into the material handling and processing system 14. Specifically, the discharge tube 56 fluidly connects the interior of the bulk bag 16 with the material handling and processing system 14, such that material can fall from the bulk bag 16 (in some instances under the assistance of the massaging paddles 26, which can massage the exterior of the bulk bag 16 to facilitate removal of the material from within the bulk bag 16) through the discharge tube 56 and into the material handling and processing system 14. As shown in FIG. 7, with the interior space seal 72 de-energized, a gap 74 may be presented between the interior space seal 72 and the main housing 34 of the bulk bag sealing system 10. Such a gap 74 may fluidly connect an interior of the material handling and processing system 14 with the interior space 70 above. In some embodiments, the gap 74 may form part of the interior space 70.

Regardless, during transfer of material from the bulk bag 16 to the material handling and processing system 14, the bulk bag sealing system 10 of embodiments of the present invention function to reduce spillage from the bulk bag sealing system 10 and to reduce particulates polluting the external environment. For example, as illustrated in FIG. 8, when the bag spout seal 52 is energized so as to seal the bulk bag 16 to the bulk bag sealing system 10, the interior space seal 72 can be simultaneously energized so as to engage an interior surface of main housing 34 so as to close off the gap 74, thereby sealing the material handling and processing system 14 from the interior space 70 above. The energization of the interior space seal 72 may be beneficial because it can function to contain airborne dust generated by material flowing into the material handling and processing system 14 from the bulk bag 16 (via the discharge tube 56). As such, when energized, the interior space seal 72 prevents dust from escaping from the material handling and processing system 14 and/or the bulk bag sealing system 10 into the surrounding external atmosphere.

In addition, however, when the bag spout seal 52 is de-energized, as is illustrated in FIG. 7, the interior space seal 72 may also be correspondingly de-energized (e.g., simultaneously), thereby allowing any material spilled into the interior space 70 (e.g., resulting from the bag spout 30 being released from the spout seal assembly 32), to flow down into the interior space 70, through the gap 74 left between the de-energized interior space seal 72 and the discharge tube 56, and into the material handling and processing system 14. Thus, the bulk bag sealing system 10 of the present invention is configured to prevent spillage and airborne dust pollution when the bulk bag 16 is (1) secured to the bulk bag sealing system 10 during discharge of material from within the bulk bag 16, and (2) being connected and disconnected to/from the bulk bag sealing system 10.

As described above, in some embodiments, the interior space seal 72 may be energized by the same fluid source 60 as that used for the bag spout seal 52. As such, the energization of the interior space seal 72 may be controlled by the same control components as the bag spout seal 52, such that energization of the bag spout seal 52 corresponds with a simultaneous energization of the interior space seal 72, and the de-energization of the bag spout seal 52 corresponds with a simultaneous de-energization of the interior space seal 72. Thus, when a full bulk bag 16 is properly positioned on the bulk bag sealing system 10, a user can actuate the associated control components of the fluid source 60, such that the bag spout seal 52 inflates against the spout sealing plate 50 sealing the bag spout 30 to the spout seal assembly 32. Simultaneously, the interior space seal 72 is also inflated, closing off the gap 74 between the main housing 34 of the bulk bag sealing system 10 and the interior space seal 72 and/or discharge tube 56. In such a configuration, material can be transferred from the bulk bag 16 to the material handling and processing system 14 via the discharge tube 56. Beneficially, however, the bag spout seal 52 prevents spillage and dust from escaping from the bulk bag 16 into the surrounding atmosphere. Additionally, the interior space seal 72 seals the interior space 70 of the bulk bag sealing system 10 from the material handling and processing system 14, thereby preventing dust and particulates from flowing from the material handling and processing system 14 back up through the bulk bag sealing system 10 and into the exterior environment.

Once the bulk bag 16 is emptied, the user can actuate the associated control components, such that the bag spout seal 52 deflates, unsealing the bag spout 30 from the spout seal assembly 32. Simultaneously, the interior space seal 72 is also deflated, opening the gap 74 between the exterior of the main housing 34 of the bulk bag sealing device 10 and the interior space seal 72 and/or the discharge tube 56. In such a configuration, any material remaining within the bulk bag 16, which may flow down within the interior space 70 of the bulk bag sealing system 10, can further fall down into the below material handling and processing system 14 through the gap 74 left between the main housing 34 and the deenergized interior space seal 72 and/or discharge tube 56. As such, the de-energized interior space seal 72 prevents any remaining material from building-up within the interior space 70 where it can be spilled from the bag sealing device and/or where it can pollute the external environment with unwanted dust and particulates.

Although the invention has been described with reference to the preferred embodiment illustrated in the attached drawing figures, it is noted that equivalents may be employed and substitutions made herein without departing from the scope of the invention as recited in the claims.

What is claimed is:

1. A sealing system for connecting a bulk bag to a material handling and processing system, wherein said sealing system comprises:
    a main housing;
    a discharge tube housed within said main housing, wherein said discharge tube is configured to fluidly connect the bulk bag with the material handling and processing system;
    a first seal configured to selectively seal the bulk bag with respect to said discharge tube; and
    a second seal configured to selectively seal an interior space of said main housing from the material handling and processing system, wherein said second seal sealing the interior space of said main housing from the material handling and processing system includes closing off a gap presented between said second seal and said main housing.

2. The sealing system of claim 1, wherein said first seal and said second seal comprise pneumatic seals.

3. The sealing system of claim 2, wherein said first seal and said second seal are each formed as an annular ring of elastic material.

4. The sealing system of claim 3, wherein said first seal is connected to an exterior surface of an upper end of said discharge tube, and wherein said second seal is connected to an exterior surface of a lower end of said discharge tube.

5. The sealing system of claim 3, wherein said first seal and said second seal are both fluidly connected to a common pneumatic air source.

6. The sealing system of claim 5, wherein said first seal and said second seal are configured to inflate simultaneously.

7. The sealing system of claim 5, wherein said sealing system further comprises a sealing plate, and wherein said first seal is configured to seal the bulk bag by compressing the bulk bag between said first seal and said sealing plate when said first seal is inflated.

8. The sealing system of claim 7, wherein said sealing plate comprises a cylindrical section of material secured to an interior surface of said main housing.

9. The sealing system of claim 5, wherein said second seal is configured to engage with an interior surface of said main housing when said second seal is inflated.

10. The sealing system of claim 1, wherein said main housing includes one or more panels configured to open to provide access to the interior space of said main housing.

11. A sealing system for connecting a bulk bag to a material handling and processing system, wherein said sealing system comprises:
- a main housing;
- a discharge tube housed within the main housing and configured to fluidly connect the bulk bag with the material handling and processing system;
- a first pneumatic seal configured to selectively seal the bulk bag to said discharge tube; and
- a second pneumatic seal positioned below said first pneumatic seal between said first pneumatic seal and the material handling and processing system, wherein said second seal is configured to engage with the main housing to seal an interior space of the main housing from the material handling and processing system.

12. The sealing system of claim 11, wherein said first seal and said second seal are each formed as an annular ring of elastic material.

13. The sealing system of claim 11, wherein said first seal is connected to an exterior surface of an upper end of said discharge tube, and wherein said second seal is connected to an exterior surface of a lower end of said discharge tube.

14. The sealing system of claim 11, wherein said first seal and said second seal are both fluidly connected to a common pneumatic air source.

15. The sealing system of claim 11, wherein said first seal and said second seal are configured to inflate simultaneously.

16. The sealing system of claim 11, wherein said sealing system further comprises a sealing plate, and wherein said first seal is configured to seal the bulk bag by compressing the bulk bag between said first seal and said sealing plate when said first seal is inflated.

17. The sealing system of claim 11, wherein said second seal is configured to engage with an interior surface of said main housing when said second seal is inflated.

* * * * *